United States Patent
Tomasi et al.

(10) Patent No.: US 11,982,395 B2
(45) Date of Patent: May 14, 2024

(54) INSULATED PIPE CONTAINING POLYURETHANE FOAM WHICH IS FOAMED BY AN ENVIRONMENTALLY FRIENDLY FOAMING AGENT AND HAS A LOW DEGREE OF BRITTLENESS

(71) Applicant: BASF SE, Ludwigshafen am Rhein (DE)

(72) Inventors: Gianpaolo Tomasi, Lemfoerde (DE); Roman Laubgan, Lemfoerde (DE); Alex Popov, Lemfoerde (DE); Carsten Ellersiek, Lemfoerde (DE); Christof Grieser-Schmitz, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 337 days.

(21) Appl. No.: 17/600,180

(22) PCT Filed: Mar. 31, 2020

(86) PCT No.: PCT/EP2020/059178
§ 371 (c)(1),
(2) Date: Sep. 30, 2021

(87) PCT Pub. No.: WO2020/201312
PCT Pub. Date: Oct. 8, 2020

(65) Prior Publication Data
US 2022/0163162 A1    May 26, 2022

(30) Foreign Application Priority Data
Apr. 2, 2019    (EP) .................................. 19166869

(51) Int. Cl.
*F16L 59/02*    (2006.01)
*F16L 59/04*    (2006.01)

(52) U.S. Cl.
CPC ............ *F16L 59/028* (2013.01); *F16L 59/04* (2013.01)

(58) Field of Classification Search
CPC .... C08G 18/092; C08G 18/222; C08G 18/42; C08G 18/2072; C08G 18/4829; C08J 9/144; C08J 9/0028; C08J 9/5033
See application file for complete search history.

(56) References Cited

U.S. PATENT DOCUMENTS

| | | | | |
|---|---|---|---|---|
| 5,010,117 A | * | 4/1991 | Herrington | .......... C08G 18/632 |
| | | | | 521/137 |
| 6,010,650 A | | 1/2000 | Schmiade | |
| 2009/0253820 A1 | * | 10/2009 | Bowman | ................ C08G 18/06 |
| | | | | 521/170 |
| 2012/0196066 A1 | * | 8/2012 | Grieser-Schmitz | ..... B32B 15/18 |
| | | | | 428/36.5 |

FOREIGN PATENT DOCUMENTS

| | | |
|---|---|---|
| CA | 2879364 A1 | 1/2014 |
| CA | 2847089 C | 6/2020 |
| CN | 104497251 A | 4/2015 |
| EP | 0865893 A2 | 9/1998 |
| EP | 0960723 A2 | 12/1999 |
| EP | 1141613 A1 | 10/2001 |
| EP | 1595904 A2 | 11/2005 |
| EP | 1428848 B1 | 6/2006 |
| EP | 1777051 B1 | 7/2008 |
| EP | 2143539 A1 | 1/2010 |
| EP | 2874808 A1 | 5/2015 |
| WO | 0039497 A1 | 7/2000 |
| WO | 0118087 A1 | 3/2001 |
| WO | 2013030203 A2 | 3/2013 |
| WO | 2018219916 A1 | 12/2018 |

OTHER PUBLICATIONS

International Search Report for corresponding PCT/EP2020/059178 dated Jun. 25, 2020, 2 Pages.
Database WPI, Week 201542, Thomson Scientific, retrieved from STN Database accession No. 2015-34047Y, XP002794572, Apr. 8, 2015, 3 pages.
European Search Report for EP Patent Application No. 19166869.8, dated Oct. 17, 2019, 3 pages.

* cited by examiner

Primary Examiner — Joseph A Miller, Jr.
(74) Attorney, Agent, or Firm — Armstrong Teasdale LLP

(57) ABSTRACT

Described herein is a process for producing a pipe insulated with polyurethane foam, where (a) isocyanates are mixed with (b) polyols, (c) blowing agent including at least one aliphatic, halogenated hydrocarbon compound (c1), made up of from 2 to 5 carbon atoms, at least one hydrogen atom and at least one fluorine and/or chlorine atom, where the compound (c1) includes at least one carbon-carbon double bond, (d) catalyst including N,N-dialkylbenzylamine, optionally (e) chain extenders and/or crosslinkers and optionally (f) auxiliaries and additives to give a reaction mixture, the reaction mixture is applied to a pipe for media and is allowed to cure to give the polyurethane foam. Also described herein is an insulated pipe obtained by such a process and a method of using such an insulated pipe as insulated composite wall pipe for district heating or district cooling networks laid in the ground.

11 Claims, No Drawings

INSULATED PIPE CONTAINING POLYURETHANE FOAM WHICH IS FOAMED BY AN ENVIRONMENTALLY FRIENDLY FOAMING AGENT AND HAS A LOW DEGREE OF BRITTLENESS

CROSS-REFERENCE TO RELATED APPLICATIONS

This application is a U.S. National Phase Application of International Patent Application No. PCT/EP2020/059178, filed Mar. 31, 2020, which claims priority to European Patent Application No. 19166869.8, filed Apr. 2, 2019, the entire contents of which are hereby incorporated by reference herein.

The present invention relates to a process for producing a pipe insulated with polyurethane foam, wherein (a) isocyanates are mixed with (b) polyols, (c) blowing agent comprising at least one aliphatic, halogenated hydrocarbon compound (c1), made up of from 2 to 5 carbon atoms, at least one hydrogen atom and at least one fluorine and/or chlorine atom, where the compound (c1) comprises at least one carbon-carbon double bond, (d) catalyst comprising N,N-dialkylbenzylamine, optionally (e) chain extenders and/or crosslinkers and optionally (f) auxiliaries and additives to give a reaction mixture, the reaction mixture is applied to a pipe for media and is allowed to cure to give the polyurethane foam. The present invention further relates to an insulated pipe obtainable by such a process and the use of such an insulated pipe as insulated composite wall pipe for district heating or district cooling networks laid in the ground.

Pipes insulated with polyurethane foams are also known in the prior art and described for example in EP 1 141 613 B1, EP A 865 893, EP 1 777 051 B1, EP 1 595 904 A2, WO 00/39497, WO 01/18087 A1, EP 2 143 539 A1 and EP 1 428 848 B1. Insulated pipeline systems are joined together from individual pipe segments. Pipe lengths of 6 m, 12 m and 16 m are normally used for this purpose. Required overhang lengths are specially manufactured or cut to size from existing ready-made material. The individual pipe segments are welded together and reinsulated in the region of the welding seam using existing sleeve assembly technology. These sleeve joints suffer from a greater damage potential than the pipe product itself. This difference results from the fact that the pipe lengths are produced under fixed, controlled conditions in production buildings. The sleeve joints are often produced under time pressure on-site at the construction location in wind and weather. Influences such as temperature, dirt and moisture often influence the quality of the sleeve joints. Furthermore, the number of sleeve joints represents a large cost factor in the installation of pipeline systems.

The majority of the individual pipes is produced by the discontinuous pipe-in-pipe production technique. In this process, the pipe for media, generally made of steel, is provided with star-shaped spacers which serve to center the inner pipe. The pipe for media is pushed into the outer jacketing pipe, in general made of polyethylene, so that there is an annular gap between the two pipes. This annular gap is filled with polyurethane foam owing to the excellent insulating properties of the latter. For this purpose, the slightly inclined double tube is provided with end caps which have ventilation holes. The liquid reaction mixture is subsequently introduced into the annular gap by means of a polyurethane metering machine so that the reaction mixture flows in still-liquid form downward in the annular gap until the reaction commences. From this point in time onward, further distribution takes place by flow of the foam which has a slowly increasing viscosity until the material has fully reacted. Such a process is, for example, described in WO 2013030203 and WO 2018219916.

It is known that chemical and/or physical blowing agents are used in the polyurethane foam industry for foaming the polymer which is formed at the same time. Chemical blowing agents are blowing agents which react with the isocyanate component to form a gas, while physical blowing agents have a low boiling point which is attained as a result of the temperature increase in the exothermically reacting reaction mixture and thus these physical blowing agents go over into the gaseous state.

In the past, chlorofluorocarbons were primarily used as physical blowing agent. However, these have now been banned in many parts of the world because they damage the ozone layer. At the present time, fluorinated hydrocarbons HFCs and hydrocarbons having a low boiling point, e.g. pentanes, are primarily used as physical blowing agents.

One problem associated with the use of alkanes as blowing agents is their combustibility. This combustibility renders alkane-containing polyol components readily combustible even at low alkane contents, which imposes particularly demanding requirements in terms of the processing conditions. Furthermore, part of the pentane can be liberated during the foaming operation. The resulting explosion risk requires high capital expenditure for safety equipment.

Fluorinated hydrocarbons (HFCs) are used wherever the capital costs of this safety equipment required to enable hydrocarbons to be used safely as physical blowing agents are too high or the apparatus required is not feasible. HFCs additionally have a further advantage over hydrocarbons, since they can lead to foams having a greater insulating effect. However, HFCs are subject to criticism for environmental reasons because of their contribution to global warming, i.e. their high "global warming potential", and are therefore also being phased out in the EU by the end of 2022.

Preferred physical blowing agents therefore have low global warming potential. This is the advantage of the halogenated olefins, known as HFOs. However, in the production of pipes, the use of these blowing agents leads to foams having a high brittleness, in particular at the ends of the pipes. This results in increased sensitivity of the foam which can lead, even under low stresses, to destruction of the foam, for example to crack formation in the foam. The ends of the pipes, directly at the end caps, are particularly prone to brittleness; here, parts of the foam can tear off and adhere to the pipe caps when the pipe caps are removed.

CN 104497251 describes the insulation of pipes with polyisocyanurate foam which is foamed as a block and subsequently cut out to fit the pipes. Halogenated olefins can be used as blowing agent and preference is given to using a combination comprising N,N-dimethylbenzylamine as catalyst. The polyisocyanurate foam is, however, very brittle due to the additional crosslinking via isocyanurate groups and has poor flow properties. It is therefore not suitable for direct foaming of an outer pipe with an economically preferred low overall density.

It was therefore an object of the present invention to provide a pipe insulated with polyurethane foam, with particularly environmentally friendly halogenated olefins being used as blowing agent and the polyurethane foam obtained having low brittleness.

The object of the invention has been achieved by a pipe insulated with polyurethane foam, obtainable by a process in which (a) isocyanates are mixed with (b) polyols, (c) blowing agent comprising at least one aliphatic, halogenated hydrocarbon compound (c1) made up of from 2 to 5 carbon atoms, at least one hydrogen atom and at least one fluorine and/or chlorine atom, where the compound (c1) comprises at least one carbon-carbon double bond, (d) catalyst comprising N,N-dialkylbenzylamine, optionally (e) chain extenders and/or crosslinkers and optionally (f) auxiliaries and additives to give a reaction mixture, the reaction mixture is applied to a pipe for media and is allowed to cure to give the polyurethane foam.

The production of pipes according to the invention is preferably carried out by (A) providing a pipe for media and an outer pipe, where the pipe for media is arranged within the outer pipe and an annular gap is formed between the pipe for media and the outer pipe, (B) introducing the polyurethane reaction mixture according to the invention into the annular gap and (C) allowing the polyurethane reaction mixture to foam and cure in the annular gap to give the polyurethane foam. The introduction of the polyurethane reaction mixture according to the invention into the annular gap between the pipe for media and outer pipe is carried out, for example, by means of a polyurethane metering machine known to those skilled in the art.

The pipe for media, which has a smaller diameter than the outer pipe, is arranged within the outer pipe so that an annular gap is formed between the pipe for media and outer pipe. The polyurethane reaction mixture is introduced into this annular gap in step (B) according to the invention.

The pipe for media which is used according to the invention is generally a steel pipe having an external diameter of, for example, from 1 to 120 cm, preferably from 4 to 110 cm. The length of the pipe for media is, for example, from 1 to 24 meters, preferably from 6 to 16 meters. In a preferred embodiment of the process of the invention, a spiral pipe is used as outer pipe.

The outer pipe used according to the invention can generally comprise any material which appears to be suitable to a person skilled in the art, for example a thermoplastic, preferably polyethylene.

The present invention therefore preferably provides the process of the invention in which a pipe based on thermoplastic is used as outer pipe.

The outer pipe generally has a thickness of from 1 to 30 mm. The internal diameter of the outer pipe is generally from 6 to 140 cm, preferably from 10 to 120 cm. The length of the outer pipe is, for example, from 1 to 24 meters, preferably from 6 to 16 meters.

The outer pipe can optionally consist of a plurality of layers which can be combined during the extrusion operation to produce the outer pipe. An example of this is the introduction of multilayer films between polyurethane foam and outer pipe, with the film comprising at least one metallic layer to improve the barrier action. Suitable outer pipes of this type are described in EP-A-960 723. This additional layer which is optionally present is preferably introduced together with the film in step (A). For example, multilayer films having aluminum as diffusion barrier can be used according to the invention.

According to the invention, all thermoplastics which have properties which are advantageous for a corresponding insulated pipe are generally suitable. Examples of thermoplastics which can be used according to the invention are selected from the group consisting of polyethylene, polypropylene and mixtures thereof; with preference being given to using polyethylene.

To introduce the reaction mixture in step (B) of the process of the invention, it is generally possible to use any apparatus known to a person skilled in the art, for example high- or low-pressure metering machines which are readily available on the market, for example from Hennecke GmbH, Cannon Deutschland GmbH or Krauss Maffei Kunststofftechnik GmbH.

The double pipe made up of pipe for media and outer pipe is, according to the invention, preferably provided on an inclinable foaming table so that it can be inclined by an angle of from 0° to 20°, preferably from 0° to 15°, particularly preferably from 0° to 10°. The ends of the double pipe are preferably provided with end caps which have ventilation holes. According to the invention, the polyurethane system can be introduced at one end of the pipe through the end caps or in the middle or at any place between one end and the middle, in each case into the annular gap between pipe for media and outer pipe present there, for example by drilling a hole. The present invention therefore preferably provides the process according to the invention, wherein the introduction of the polyurethane system in step (B) is carried out at one end of the pipe or in the middle of the pipe or at any place between one end and the middle of the pipe.

In a preferred embodiment of the process of the invention, the polyurethane reaction mixture is introduced, in step (B), into the middle of the double pipe made up of pipe for media and outer pipe, which is provided in step (A). The double pipe is therefore oriented appropriately in step (A), for example horizontally.

For the purposes of the invention, the middle of the pipe corresponds to a region which is at from about 35 to 70%, preferably from 40 to 60%, particularly preferably from 45 to 55%, of the length of the outer pipe.

During and after introduction, the liquid reaction mixture, i.e. the polyurethane system according to the invention, flows in still liquid form downward in the gap until the polymerization reaction with foaming commences. From this point in time onward, further distribution takes place by flow of the foam whose viscosity slowly increases until the material has fully reacted.

As isocyanates (a), use is made of the customary aliphatic, cycloaliphatic and in particular aromatic diisocyanates and/or polyisocyanates. Preference is given to using diphenylmethane diisocyanate (MDI) and in particular mixtures of diphenylmethane diisocyanate and higher homologues thereof having more than two rings (crude MDI). The isocyanates can also be modified, for example by incorporation of uretdione, carbamate, isocyanurate, carbodiimide, allophanate and in particular urethane groups.

The isocyanate component (a) can also be employed in the form of polyisocyanate prepolymers. These prepolymers are known from the prior art. Production is carried out in a manner known per se by reacting the above-described polyisocyanates (a), for example at temperatures of about 80° C., with compounds having hydrogen atoms which are reactive toward isocyanates, preferably with polyols, to form polyisocyanate prepolymers. The polyol/polyisocyanate ratio is generally selected so that the NCO content of the prepolymer is from 8% to 25% by weight, preferably from 10% to 22% by weight, particularly preferably from 13% to 20% by weight.

Particular preference is given according to the invention to using a mixture of monomeric diphenylmethane diisocyanate and higher homologues thereof having more than two rings, known as polymeric MDI, as isocyanate component. Such isocyanates are commercially available, for example from BASF SE under the trade names Lupranat® M20 and Lupranat® M50.

In a preferred embodiment, the isocyanate component (a) is selected so that it has a viscosity of less than 800 mPas, preferably from 100 to 650, particularly preferably from 120 to 400, in particular from 180 to 350 mPas, measured in accordance with DIN 53019 at 20° C.

Possible polyols (constituent (b)) are in general compounds having at least two groups which are reactive toward isocyanate, i.e. having at least two hydrogen atoms which are reactive toward isocyanate groups. Examples of such compounds are compounds having OH groups, SH groups and/or NH groups, preferably OH groups. Preference is given to using polyesterols and/or polyetherols as polyols (b). The average functionality of the polyetherols and/or polyesterols is generally from 1.9 to 8, preferably from 2.4 to 7, particularly preferably from 2.6 to 6. In the case of polyetherols, the functionality of the starter molecules is assumed to calculate the average functionality. The polyols (b) have a hydroxyl number of generally greater than 20 mg KOH/g, preferably greater than 30 mg KOH/g, particularly preferably greater than 40 mg KOH/g. 700 mg KOH/g, preferably 600 mg KOH/g, particularly preferably 500 mg KOH/g, very particularly 400 mg KOH/g, has generally been found to be an appropriate upper limit to the hydroxyl number. The OH numbers indicated above relate to the totality of the polyols (b), which does not preclude individual constituents of the mixture from having higher or lower values. The number-average molecular weight of the polyols (b1) is preferably greater than 400 g/mol.

Component (b) preferably comprises polyether polyols which are produced by known methods, for example from one or more alkylene oxides having from 2 to 4 carbon atoms in the alkylene radical by anionic polymerization using alkali metal hydroxides such as sodium or potassium hydroxide or alkali alkoxides such as sodium methoxide, sodium or potassium ethoxide or potassium isopropoxide as catalysts and with addition of at least one starter molecule comprising from 2 to 8, preferably from 3 to 8, reactive hydrogen atoms in bound form or by cationic polymerization using Lewis acids such as antimony pentachloride, boron fluoride etherate, etc., or bleaching earth as catalysts.

Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides may be used individually, alternately in succession or as mixtures. Possible starter molecules are alcohols such as glycerol, trimethylolpropane (TMP), pentaerythritol, sugar compounds such as sucrose, sorbitol and also amines such as methylamine, ethylamine, isopropylamine, butylamine, benzylamine, aniline, toluidine, toluenediamine (TDA), naphthylamine, ethylenediamine (EDA), diethylenetriamine, 4,4'-methylenedianiline, 1,3-propanediamine, 1,6-hexanediamine, ethanolamine, diethanolamine, triethanolamine and the like.

Furthermore, condensation products of formaldehyde, phenol and diethanolamine or ethanolamine, formaldehyde, alkylphenols and diethanolamine or ethanolamine, formaldehyde, bisphenol A and diethanolamine or ethanolamine, formaldehyde, aniline and diethanolamine or ethanolamine, formaldehyde, cresol and diethanolamine or ethanolamine, formaldehyde, toluidine and diethanolamine or ethanolamine and formaldehyde, toluenediamine (TDA) and diethanolamine or ethanolamine and the like can be used as starter molecules.

Preference is given to using glycerol, sucrose, sorbitol and TDA as starter molecule.

According to the invention, at least one blowing agent (c) is used. This comprises at least one aliphatic, halogenated hydrocarbon compound (c1), made up of from 2 to 5, preferably 3 or 4, carbon atoms, at least one hydrogen atom and at least one fluorine and/or chlorine atom, where the compound (c1) comprises at least one carbon-carbon double bond. Suitable compounds (c1) include trifluoropropenes and tetrafluoropropenes, e.g. (HFO-1234), pentafluoropropenes, e.g. (HFO-1225), chlorotrifluoropropenes, e.g. (HFO-1233), chlorodifluoropropenes and chlorotetrafluoropropenes and also mixtures of one or more of these components. Particular preference is given to tetrafluoropropenes, pentafluoropropenes and chlorotrifluoropropenes, where the unsaturated, terminal carbon atom bears more than one chlorine or fluorine substituent. Examples are 1,3,3,3-tetrafluoropropene (HFO-1234ze); 1,1,3,3-tetrafluoropropene; 1,2,3,3,3-pentafluoropropene (HFO-1225ye); 1,1,1-trifluoropropene; 1,1,1,3,3-pentafluoropropene (HFO-1225zc); 1,1,1,3,3,3-hexafluorobut-2-ene, 1,1,2,3,3-pentafluoropropene (HFO-1225yc); 1,1,1,2,3-pentafluoropropene (HFO-1225yez); 1-chloro-3,3,3-trifluoropropene (HCFO-1233zd); 1,1,1,4,4,4-hexafluorobut-2-ene or mixtures of two or more of these components.

Particularly preferred compounds (c1) are hydroolefins selected from the group consisting of trans-1-chloro-3,3,3-trifluoropropene (HCFO-1233zd (E)), cis-1-chloro-3,3,3-trifluoropropene (HCFO-1233zd (Z)), trans-1,1,1,4,4,4-hexafluorobut-2-ene (HFO-1336mzz (E)), cis-1,1,1,4,4,4-hexafluorobut-2-ene (HFO-1336mzz (Z)), trans-1,3,3,3-tetrafluoroprop-1-ene (HFO-1234ze (E)), cis-1,3,3,3-tetrafluoroprop-1-ene (HFO-1234ze (Z)) or mixtures of one or more of these components.

Blowing agents (c1) are preferably used in an amount of from 1 to 30% by weight, particularly preferably from 2 to 25% by weight and in particular from 3 to 20% by weight, based on the total weight of components (b).

Apart from blowing agents (c1), it is possible to use further chemical and/or physical blowing agents (c2). Chemical blowing agents (c2) are compounds which react with isocyanate groups with elimination of gases, in particular carbon dioxide or carbon dioxide and carbon monoxide. These are usually water and/or formic acid, preferably water.

Physical blowing agents (c2) can also be used instead of or in combination with the chemical blowing agents. These physical blowing agents are compounds which are inert toward the starting components, are mostly liquid at room temperature and vaporize under the conditions of the urethane reaction, with the exception of the blowing agents (c1). The boiling point of these compounds is preferably below 50° C. Physical blowing agents (c2) also include compounds which are gaseous at room temperature and are introduced under superatmospheric pressure into the starting components or are dissolved therein, for example carbon dioxide, low-boiling alkanes and fluoroalkanes.

The blowing agents (c2) are usually selected from the group consisting of water, formic acid, alkanes and/or cycloalkanes having at least 4 carbon atoms, dialkyl ethers, esters, ketones, acetals, fluoroalkanes having from 1 to 8 carbon atoms and tetraalkylsilanes having from 1 to 3 carbon atoms in the alkyl chain, in particular tetramethylsilane.

In a particularly preferred embodiment, preference is given to using only chemical blowing agents (c2) and no further physical blowing agents (c2) in addition to the blowing agents (c1). Particular preference is given to using water as blowing agent (c2), preferably in an amount of up to 8% by weight, particularly preferably up to 4% by weight and in particular up to 2.5% by weight. It is also possible not to add any blowing agent (c2). In this case, the components used nevertheless usually comprise small amounts of water because of their hygroscopic nature.

The catalysts (d) used comprise N,N-dialkylbenzylamine, where alkyl groups having from 1 to 6 carbon atoms, particularly preferably methyl and/or ethyl groups, are preferably comprised as alkyl groups. In particular, N,N-dimethylbenzylamine (CAS No. 103-83-3) is used as N,N-dialkylbenzylamine. Here, the proportion of N,N-dialkylbenzylamine is preferably from 0.05 to 3% by weight, particularly preferably from 0.1 to 2% by weight, very particularly preferably from 0.2 to 1% by weight, in each case based on the total weight of the components (b), (d) and, if present, (e).

Apart from N,N-dialkylbenzylamine, the catalysts (d) preferably comprise further compounds which strongly accelerate the reaction of the compounds of the components (b) comprising reactive hydrogen atoms, in particular hydroxyl groups, with the polyisocyanates (a).

It is advantageous to use basic polyurethane catalysts, for example tertiary amines, such as triethylamine, tributylamine, dimethylbenzylamine, dicyclohexylmethylamine, dimethylcyclohexylamine, bis(N,N'-dimethylaminoethyl) ether, bis(dimethylaminopropyl) urea, N-methylmorpholine or N-ethylmorpholine, N-cyclohexylmorpholine, N,N,N',N'-tetramethylethylenediamine, N,N,N,N-tetramethylbutanediamine, N,N,N,N-tetramethylhexane-1,6-diamine, pentamethyldiethylenetriamine, bis(2-dimethylaminoethyl) ether, dimethylpiperazine, N-dimethylaminoethylpiperidine, 1,2-dimethylimidazole, 1-azabicyclo[2.2.0] octane, 1,4-diazabicyclo[2.2.2] octane (Dabco) and alkanolamine compounds, such as triethanolamine, triisopropanolamine, N-methyldiethanolamine and N-ethyldiethanolamine, dimethylaminoethanol, 2-(N,N-dimethylaminoethoxy)ethanol, N,N',N"-tris(dialkylaminoalkyl) hexahydrotriazines, e.g. N,N',N"-tris(dimethylaminopropyl)-s-hexahydrotriazine, and triethylenediamine. Further possible catalysts are: Amidines such as 2,3-dimethyl-3,4,5,6-tetrahydropyrimidine, tetraalkylammonium hydroxides such as tetramethylammonium hydroxide, alkali metal hydroxides such as sodium hydroxide and alkali metal alkoxides such as sodium methoxide and potassium isopropoxide, alkali metal carboxylates and also alkali metal salts of long-chain fatty acids having from 10 to 20 carbon atoms and optionally lateral OH groups.

Preference is given to using at least one basic polyurethane catalyst, preferably from the group of tertiary amines, in addition to the N,N-dialkylbenzylamine. Particular preference is given to using dimethylcyclohexylamine, triethylamine, tetramethylhexanediamine, N,N',N"-tris(dialkylaminopropyl)hexahydrotriazine or 1,4-diazabicyclo[2.2.2] octane. In particular, the catalyst comprises dimethylcyclohexylamine. Furthermore, the catalyst (d) can additionally comprise at least one catalyst from the group of trimerization catalysts, preferably ammonium ion salts or alkali metal salts, particularly preferably ammonium or alkali metal carboxylates.

Preference is given to using from 0.001 to 10 parts by weight, particularly preferably from 0.01 to 7 parts by weight, especially from 0.1 to 5 parts by weight, of catalyst or catalyst combination, based on the total weight of the components (b), (d) and, if present, (e). The amount of catalyst here is preferably selected so that a fiber time of the foam of from 80 to 500 seconds, particularly preferably from 100 to 400 seconds and in particular from 120 to 300 seconds, is obtained. These fiber times are at a component temperature of 25° C. and a mixing pressure of 150 bar.

As chain extenders and/or crosslinkers (e), for example for modifying the mechanical properties, e.g. the hardness, it is possible to use diols and/or triols or amino alcohols having molecular weights of less than 280 g/mol, preferably from 62 to 250 mg KOH/g, more preferably from 62 to 200 mg KOH/g, even more preferably from 62 to 150 g/mol and in particular from 60 to 130 g/mol. Here, chain extenders are bifunctional, while crosslinkers have a functionality of 3 and more. Possibilities are, for example, aliphatic, cycloaliphatic and/or araliphatic diols having from 2 to 8, preferably from 2 to 6, carbon atoms, e.g. ethylene glycol, 1,2-propylene glycol, diethylene glycol, dipropylene glycol, 1,3-propanediol, 1,4-butanediol, 1,6-hexanediol, o-, m-, p-dihydroxycyclohexane, bis(2-hydroxyethyl)hydroquinone. Aliphatic and cycloaliphatic triols such as glycerol, trimethylolpropane and 1,2,4- and 1,3,5-trihydroxycyclohexane and also N,N,N',N'-tetrakis(2-hydroxypropyl)ethylenediamines (Quadrol®) are likewise possible.

If chain extenders, crosslinkers or mixtures thereof are employed for producing the polyurethane foam of the invention, they are advantageously used in an amount of from 0 to 15% by weight, preferably from 0 to 5% by weight, based on the total weight of the components (b), (d) and (e). These components preferably comprise less than 2% by weight and particularly preferably less than 1% by weight of chain extenders and/or crosslinkers (e) and in particular no chain extenders and/or crosslinkers (e).

Auxiliaries and additives (f) can optionally also be used for producing the reaction mixture according to the invention. For the purposes of the present invention, auxiliaries and additives (f) are the customary auxiliaries and additives known in the prior art. Mention may be made by way of example of surface-active substances, foam stabilizers, cell regulators, fillers, inorganic and organic thixotropic agents, dyes, pigments, flame retardants, antistatics, hydrolysis inhibitors and/or fungistatic and bacteriostatic substances.

The present invention provides, in particular, the process of the invention in which from 1 to 25% by weight of flame retardants, based on the total weight of the components (b), (d), (e) and (f), is used as auxiliary and additive (f).

Inorganic thixotropic agents comprise organic sheet silicates, hydrophobic or hydrophilic pyrogenic silicas, organic thixotropic agents comprise polyesters, toluenediamide (TDA) and derivatives thereof, liquid thixotropic agents based on urea urethanes, for example isophoronediamine (CAS No. 2855-13-2), 2,2'-dimethyl-4,4'-methylenebis(cyclohexylamine) (CAS No. 6864-37-5), diethyltoluenediamine (CAS No. 68479-98-1), triethylene glycol diamine and polyoxypropylenediamine (CAS No. 9046-10-0). Such thixotropic agents are described, for example, in EP 2874808.

To produce the rigid polyurethane foams, the components (a) to (d) and, if present, (e) and (f), are mixed to give a reaction mixture. Preference is given to employing the 2-component process in which the components (b), (c), (d) and optionally (e) and (f) are mixed to give a polyol component and this is subsequently mixed with the polyisocyanate (a). This two-component process has been found to be preferred in practice. As an alternative, the blowing agent (c) can be added, in its entirety or in part, only in the production of the reaction mixture. For the purposes of the present invention, the expression "a reaction mixture" refers to the mixture of the isocyanates (a) and the compounds (b)

which are reactive toward isocyanate at reaction conversions of less than 90%, based on the isocyanate groups.

The starting materials (b), (d) and, if present, (e) and (f) and also chemical blowing agents (c2) are preferably selected so that a mixture consisting of these components generally has a viscosity of from 200 to 10 000 mPas, preferably from 500 to 9500 mPas, particularly preferably from 1000 to 9000 mPas, very particularly preferably from 2500 to 8500 mPas, in particular from 3100 to 8000 mPas, in each case measured in accordance with DIN 53019 at 20° C.

In the process according to the invention, polyisocyanates (a) and the polyol component comprising the components: (b), (c), (d), (e) and optionally (f) are reacted in such amounts that the isocyanate index is in the range from 90 to 180, preferably from 95 to 180, more preferably from 100 to 180, particularly preferably from 100 to 175 and especially from 105 to 160. The isocyanate index is the molar ratio of isocyanate groups to groups which are reactive toward isocyanate groups multiplied by 100. The polyurethane foam of the invention thus also encompasses a polyurethane foam modified with isocyanurate groups. In a preferred embodiment, the components (a) and (b) of the polyurethane system are selected so that the resulting foam has a compressive strength (at a foam density of 60 kg/m3) of greater than 0.2 N/mm2, preferably greater than 0.25 N/mm2, particularly preferably greater than 0.3 N/mm2, in each case measured in accordance with DIN 53421.

In general, the overall shot density in the process of the invention is from 20 to 200 kg/m3, preferably from 25 to <80 kg/m3, particularly preferably from 30 to <70 kg/m3, very particularly preferably from 30 to <65 kg/m3 and in particular from 35 to <60 kg/m3. The overall shot density is generally taken to be the total amount of liquid polyurethane material introduced divided by the total volume of the annular gap to be filled with foam.

The process of the invention can generally be carried out at any compaction which appears suitable to a person skilled in the art. For the purposes of the present invention, compaction is the total fill density of the pipe gap divided by the free-foamed core foam density determined in an uncompacted foam body.

The present invention preferably provides the process according to the invention, in which the reaction is carried out at a compaction of less than 4.0, preferably less than 3.5, particularly preferably less than 3.0 and very particularly preferably less than 2.5.

The foaming and curing are, according to the invention, generally carried out at a component temperature of from 18 to 40° C., preferably from 18 to 35° C., particularly preferably from 22 to 30° C. Foaming and curing are, according to the invention, generally carried out at a surface temperature of from 15 to 50° C., preferably from 20 to 50° C., particularly preferably from 25 to 45° C.

The insulating layer generally has a thickness of from 1 to 20 cm, preferably from 3 to 20 cm, particularly preferably from 5 to 20 cm. In a further preferred embodiment, the insulating layer comprising polyurethane foam has a thermal conductivity of less than 27 mW/mK, preferably less than 26 mW/mK, particularly preferably less than 25 mW/mK, very particularly preferably less than 24 mW/mK, in particular less than 23 mW/mK, in each case measured in accordance with EN ISO 8497 (at an average temperature of 50° C.). The process of the invention can also comprise further steps. For example, the insulated pipe which has been formed can be treated, for example by cutting the continuously produced and thus in principle endless insulated pipe into desired lengths, for example into lengths of 6, 12 or 16 m.

In a particularly preferred embodiment, the insulated pipe produced according to the invention is an insulated composite wall pipe for district heating or district cooling networks laid in the ground, which satisfies the requirements of DIN EN 253: 2015-12.

The pipes according to the invention, which are insulated with polyurethane foam, have an outstandingly low thermal conductivity combined with excellent mechanical properties, in particular a low brittleness, even directly at the ends of the pipe.

The invention will be illustrated below with the aid of examples.

EXAMPLES

Table 1 below shows the constituents of a pipe insulation system for discontinuous processing:

TABLE 1

| Material | Type | OH number [mg KOH/g] | Part by weight/parts by weight |
|---|---|---|---|
| Sucrose-initiated polyether | | 403 | 17.6 |
| TDA-initiated polyether | | 390 | 30.0 |
| Sorbitol-initiated polyether | | 490 | 12.0 |
| Polyester having a functionality of 2 | | 210 | 30.0 |
| Glycerol-initiated polyether | | 805 | 5.0 |
| Water | | — | 2.4 |
| Silicone stabilizer Niax Silicone L-6900 | | 40 | 3.0 |
| Trans-1-chloro-3,3,3-trifluoropropene | | | 22 |

A PMDI (Lupranat® M 20S: NCO content 31.5%, functionality: 2.7) is used as isocyanate. The polyol component is mixed with the isocyanate in a mass ratio of 100:150 using a hand mixer at a component temperature of in each case 20° C. The index of this foam is 152. Polyurethane foams were produced using different catalyst combinations. The catalyst combinations are indicated in Table 2; all amounts are in parts by weight.

TABLE 2

| | Ref. | Ex. 1 | Ex. 2 | Ex. 3 |
|---|---|---|---|---|
| N,N-dimethylcyclohexylamine | 0.3 | 0.3 | 0.3 | 0.3 |
| Dabco TMR-31 | 0.4 | 0 | 0 | 0.4 |
| Potassium acetate w = 50% | 0 | 0 | 0.2 | 0 |
| N,N-dimethylbenzalamine | 0 | 0.4 | 0.4 | 0.4 |
| S-triazine | 0.2 | 0.2 | 0 | 0.2 |
| Cream time [s] | 32 | 29 | 37 | |
| Fiber time [s] | 180 | 170 | 190 | |
| Rise time [s] | 290 | 260 | 300 | |
| Brittleness | 6 | 1 | 1 | 1 |

Examples 1 to 3 display significantly improved values for the brittleness compared to the reference example without N,N-dimethylbenzalamine at similar curing rates.

As measure of the brittleness of the rigid polyurethane foam, the brittleness was assessed subjectively immediately after foaming by pressing the foam (brittleness subjective) and graded according to a system of grades from 1 to 6. 1 means that the foam is barely brittle, while 6 means that the foam has a high brittleness.

Pipes were also foamed using the foams of the reference example and example 3. The brittleness was assessed on taking off the end cap and was no different from the free-foamed specimens.

The invention claimed is:

1. A process for producing a pipe insulated with polyurethane foam, comprising
mixing
(a) an isocyanate,
(b) a polyol,
(c) a blowing agent comprising at least one aliphatic, halogenated hydrocarbon compound (c1), made up of from 2 to 5 carbon atoms, at least one hydrogen atom and at least one fluorine and/or chlorine atom, where the compound (c1) comprises at least one carbon-carbon double bond,
(d) a catalyst comprising N,N-dialkylbenzylamine,
(e) optionally chain extenders and/or crosslinkers, and
(f) optionally auxiliaries and additives,
to give a reaction mixture, wherein the isocyanate index is in the range from 90 to 180,
applying the reaction mixture to a pipe for media, and curing the reaction mixture to give the polyurethane foam.

2. The process according to claim 1, wherein the blowing agent (e1) is selected from the group consisting of trifluoropropenes and tetrafluoropropenes, pentafluoropropenes, chlorotrifluoropropenes, chlorodifluoropropenes and chlorotetrafluoropropenes and also mixtures of one or more of these components.

3. The process according to claim 1, wherein the blowing agent (c1) is selected from the group consisting of trans-1-chloro-3,3,3-trifluoropropene (HCFO-1233 zd (E)), cis-1-chloro-3,3,3-trifluoropropene (HCFO-1233 zd (Z)), trans-1,1,1,4,4,4-hexafluorobut-2-ene (HFO-1336mzz (E)), cis-1,1,1,4,4,4-hexafluorobut-2-ene (HFO-1336mzz (Z)), trans-1,3,3,3-tetrafluoroprop-1-ene (HFO-1234ze (E)), cis-1,3,3,3-tetrafluoroprop-1-ene (HFO-1234ze (Z)) and mixtures of one or more components thereof.

4. The process according to claim 1, wherein the density of the pipe insulation is from 30 to 200 kg/m3.

5. The process according to claim 1, wherein the proportion of blowing agent (c1), based on the total weight of the components (b) and (d), is from 10 to 30% by weight.

6. The process according to claim 1, wherein the proportion of N,N-dialkylbenzylamine is from 0.05 to 3% by weight, based on the total weight of polyols (b) and catalyst (e).

7. The process according to claim 1, wherein N,N-dimethylbenzylamine is used as N,N-dialkylbenzylamine.

8. The process according to claim 1, wherein the production of the insulated pipe is carried out at an isocyanate index of from 105 to 160.

9. The process according to claim 1, wherein the insulated pipe is produced by
(A) providing a pipe for media and an outer pipe, wherein the pipe for media is arranged within the outer pipe and an annular gap is formed between pipe for media and outer pipe,
(B) introducing the polyurethane reaction mixture into the annular gap and
(C) allowing the polyurethane reaction mixture to foam and cure in the annular gap to give the polyurethane foam.

10. The process according to claim 1, wherein the blowing agent (c1) is selected from the group consisting of tetrafluoropropenes, pentafluoropropenes, and chlorotrifluoropropenes, wherein the unsaturated, terminal carbon atom bears more than one chlorine or fluorine substituent.

11. The process according to claim 1, wherein the blowing agent (c1) is selected from the group consisting of 1,3,3,3-tetrafluoropropene (HFO-1234ze); 1,1,3,3-tetrafluoropropene; 1,2,3,3,3-pentafluoropropene (HFO-1225ye); 1,1,1-trifluoropropene; 1,1,1,3,3-pentafluoropropene (HFO-1225zc); 1,1,1,3,3,3-hexafluorobut-2-ene, 1,1,2,3,3-pentafluoropropene (HFO-1225yc); 1,1,1,2,3-pentafluoropropene (HFO-1225yez); 1-chloro-3,3,3-trifluoropropene (HCFO-1233zd); 1,1,1,4,4,4-hexafluorobut-2-ene and mixtures of two or more of these components.

* * * * *